(12) United States Patent
Stapleton et al.

(10) Patent No.: US 12,269,373 B2
(45) Date of Patent: Apr. 8, 2025

(54) VEHICLE SEAT ASSEMBLY

(71) Applicant: Brose Fahrzeugteile SE & Co. Kommanditgesellschaft, Coburg, Coburg (DE)

(72) Inventors: Dakota Stapleton, Flushing, MI (US); Umesh Handigol, Rochester, MI (US)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 327 days.

(21) Appl. No.: 18/081,838

(22) Filed: Dec. 15, 2022

(65) Prior Publication Data
US 2024/0042901 A1 Feb. 8, 2024

Related U.S. Application Data

(63) Continuation-in-part of application No. 17/880,216, filed on Aug. 3, 2022, now Pat. No. 12,145,480.

(51) Int. Cl.
*B60N 2/02* (2006.01)
*B60N 2/08* (2006.01)
*B60N 2/12* (2006.01)

(52) U.S. Cl.
CPC ......... *B60N 2/0292* (2013.01); *B60N 2/0825* (2013.01); *B60N 2/085* (2013.01); *B60N 2/12* (2013.01); *B60N 2002/0208* (2013.01); *B60N 2002/0216* (2013.01)

(58) Field of Classification Search
CPC .... B60N 2/0292; B60N 2/0825; B60N 2/085; B60N 2/12; B60N 2/10; B60N 2/3065; B60N 2/3031; B60N 2/305; B60N 2/307; B60N 2/36; B60N 2002/0208; B60N 2002/0216
See application file for complete search history.

(56) References Cited

U.S. PATENT DOCUMENTS

| | | |
|---|---|---|
| 6,250,704 B1 | 6/2001 | Garrido |
| 8,424,969 B2 | 4/2013 | Kämmerer |
| 10,974,621 B2 | 4/2021 | Jung et al. |

FOREIGN PATENT DOCUMENTS

| | | |
|---|---|---|
| DE | 199006662 A1 | 9/2000 |
| DE | 102004054165 A1 | 5/2006 |
| JP | 2019064507 A | 4/2019 |
| KR | 20200143585 A | 12/2020 |

(Continued)

OTHER PUBLICATIONS

International Search Report & Written Opinion for PCT/US2023/084304, Dated Apr. 18, 2024, All together 12 Pages.

*Primary Examiner* — Mark R Wendell
(74) *Attorney, Agent, or Firm* — Dickinson Wright PLLC

(57) ABSTRACT

A vehicle seat including a base, an unlocking device, a release lever, a seat cushion, and a lifter. The unlocking device configured to selectively lock a translatable rail to a fixed rail, the release lever coupled to the base and configured to rotate about a first axis to actuate the unlocking device. The seat cushion coupled to the base and configured to pivot about a second axis between a use position and a non-use position. The lifter configured to rotate about a third axis between a first position, in which the seat cushion is in the non-use position, wherein as the lifter moves from the first position to the second position, the lifter bracket pivots the seat cushion between the use position and the non-use position and engages the release lever to actuate the unlocking device to unlock the translatable rail from the fixed rail.

20 Claims, 12 Drawing Sheets

(56) References Cited

FOREIGN PATENT DOCUMENTS

| | | | |
|---|---|---|---|
| WO | 2021119576 | A1 | 6/2021 |
| WO | 2021214127 | A1 | 10/2021 |
| WO | 2022174916 | A1 | 8/2022 |

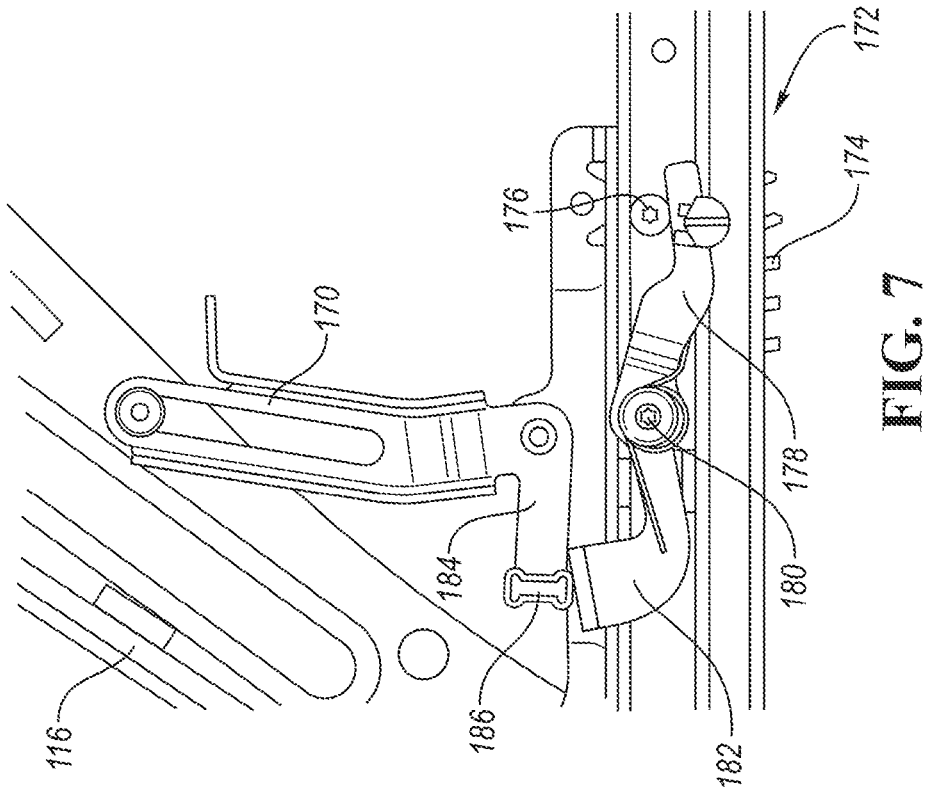
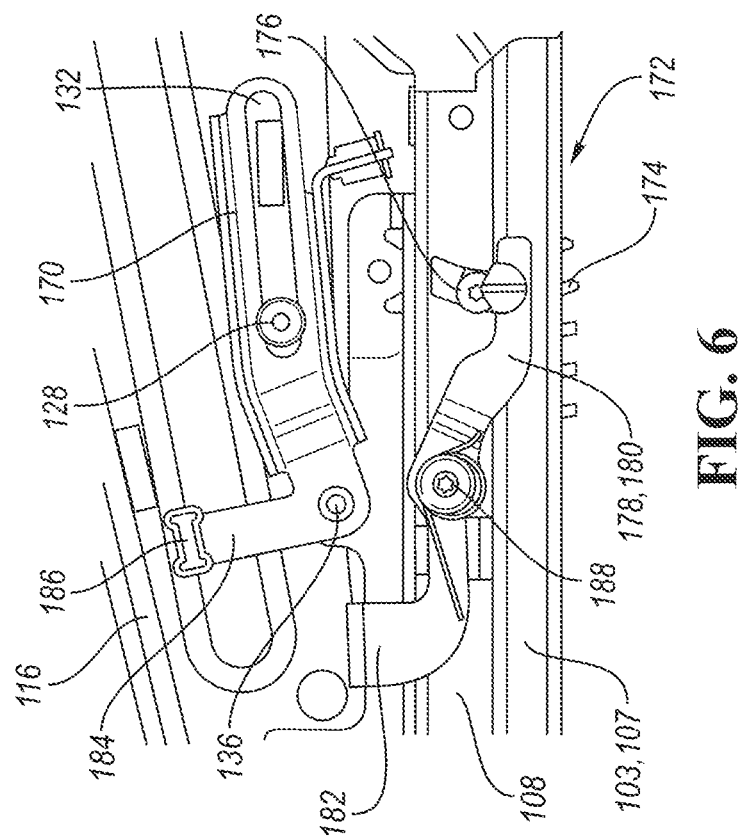

VEHICLE SEAT ASSEMBLY

TECHNICAL FIELD

The present disclosure relates to a seat assembly for use in a vehicle.

BACKGROUND

Vehicles, in particular sport utility vehicles (SUVs), may include three rows of seats to accommodate six to nine passengers. Each of the rows of seats may be configured to change between a use position, a boarding position, in which the seat is positioned to provide access to the second or third rows of seats, and a fold-flat position, in which the seat may be relatively flat to provide additional storage space within the vehicle.

SUMMARY

According to one embodiment, a seat assembly for use in a vehicle is provided. The seat assembly may include a base, a seat cushion, a backrest, a cam follower, and a cam. The seat cushion may be pivotally coupled to the base and the backrest may be pivotally coupled to the seat cushion. The cam follower may be coupled to the seat cushion and the cam may be rotationally coupled to the base and configured to engage the cam follower. The cam may be configured to engage the cam follower and may be configured to rotate between a first position, in which the seat cushion is in a use position, and a second position, in which the seat cushion is in a non-use position. As the cam rotates between the first position and the second position, a front portion of the seat cushion may tilt towards the base and a rear portion of the seat cushion may be tilted away from the base.

According to another embodiment, a seat assembly for use in a vehicle is provided. The seat assembly may be configured to move between a use position, a fold-flat position, and a boarding position. The seat assembly may include a base, a seat cushion, a backrest, a cam follower, and a cam. The seat cushion may include a side panel including a first end, pivotally coupled the base, and second end spaced apart from the first end. The backrest may be pivotally coupled to the seat cushion. The cam follower may be coupled to the seat cushion and the cam may be rotationally coupled to the base and configured to engage the cam follower. The cam may be configured to rotate between a first position, in which the seat cushion is in either the use position or the fold-flat position, and a second position, in which the seat cushion is in the boarding position. As the cam rotates between the first position and the second position, a front portion of the seat cushion may be tilted towards the base and the second end of the side panel may be tilted away from the base.

According to yet another embodiment, a vehicle seat is provided. The vehicle seat may include a base, a seat cushion, a backrest, a cam follower, and a cam. The base may include a fixed rail, a translating rail, and a rail bracket. The fixed rail may be configured to be attached to a vehicle floor, the translating rail may be configured to move along the fixed rail, and the rail bracket may be fixed to the translating rail. The seat cushion may include a side panel that may be provided with a first end and a second end, the first end may be pivotally coupled the upper rail bracket, the backrest may be pivotally coupled to the seat cushion. The cam follower may be coupled to the seat cushion and the cam may be disposed between the first and the second end of the side panel and rotationally coupled to the rail bracket. The cam may be configured to rotate in a first rotational direction, to raise the second end of the side panel away from the base and rotate the first end of the side panel, and a second rotational direction to lower the side panel towards the base.

BRIEF DESCRIPTION OF THE DRAWINGS

FIG. 6 illustrates a detailed perspective view of a portion of another exemplary seat assembly provided with a cam disposed in a first position.

FIG. 7 illustrates a detailed perspective view of the exemplary seat assembly illustrated in FIG. 6 provided with a cam disposed in a first position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain vehicle seats may be configured to move between a number of positions to provide a number of functions. As an example, the seat may be placed in a use position to support an occupant, the seat may also be placed in a non-use position, such as a boarding position or a fold-flat position. It may be desirable to manipulate the seat between these positions in a relatively fast manner, such as by a spring that may bias portions of the seat to the desired position. As an example, it may also be desirable to maintain an angle between the backrest and the cushion of the seat so that the seat may be moved from the use position to the boarding position without altering the angle of the backrest with respect to the cushion. This may eliminate the need to readjust the position of the backrest after the seat is returned to the use position. Moreover, if the seat is supporting a child seat, the seat may be moved from the use position to the non-use position without removal of the child seat.

Figure 1:
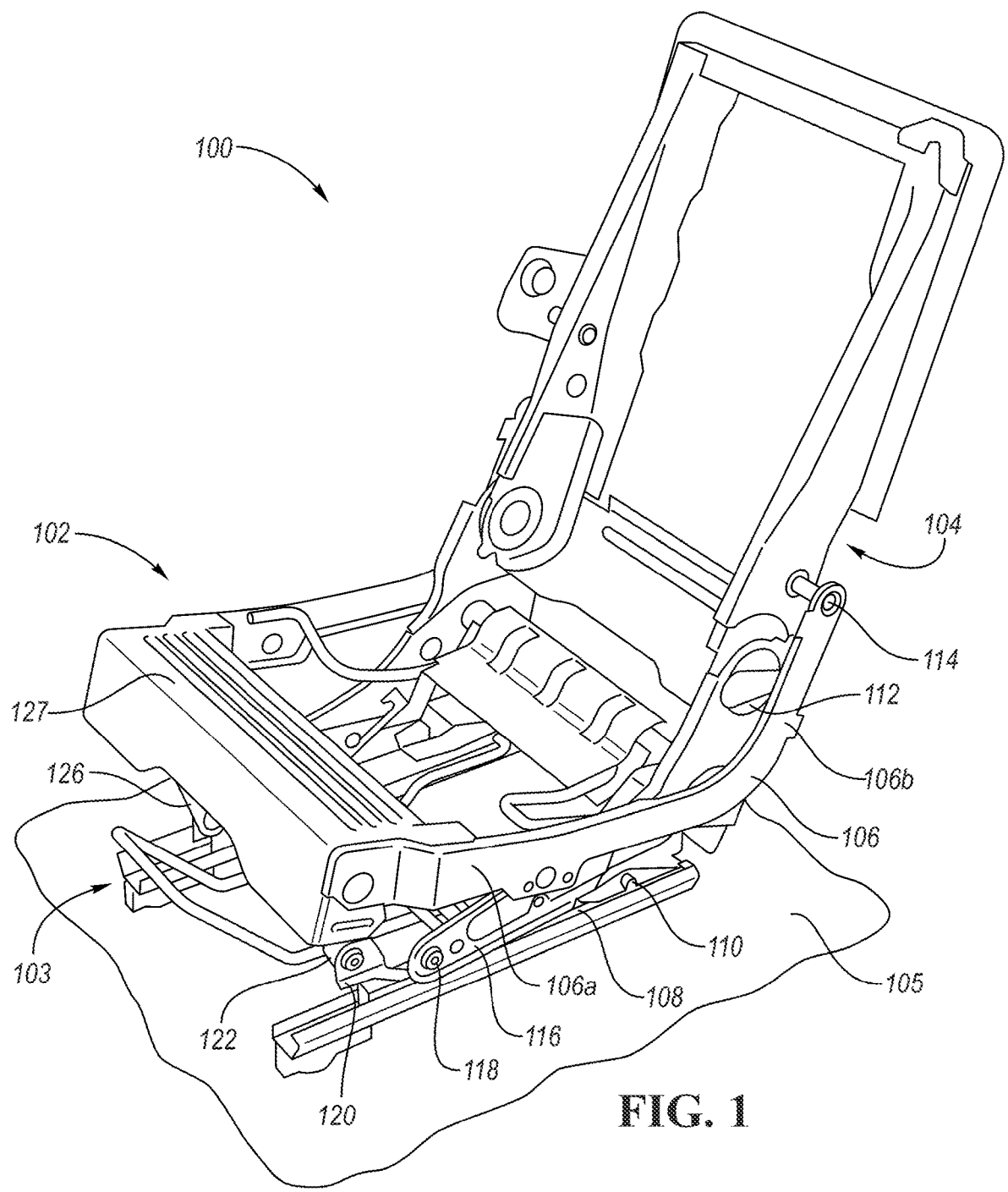
FIG. 1 illustrates a perspective view of an exemplary seat assembly.

FIG. 1 illustrates a perspective view of an exemplary vehicle seat 100 including a seat cushion assembly 102 and a backrest assembly 104, each disposed in a use-position configured to support a vehicle occupant (not illustrated). A base 103 may be provided to support the cushion assembly 102. As an example, the base 103 may include a fixed rail 107 (FIG. 2), that may be fixed to a vehicle floor 105, and a translatable rail 108 that may be configured to move along the fixed rail 107 when the longitudinal position of the vehicle seat 100 is adjusted. The base 103 may include one or more rail brackets, such as a first upper rail bracket 120 and a second upper rail bracket 124 that may be disposed on each lateral side of the vehicle seat 100. As an example, the first and second upper rail brackets 120, 124 may be fixed to the translatable rail or translatable rails 108.

The cushion assembly 102 may include one or more front links 122, 126 that may be pivotally or rotationally coupled to the base 103, such as the first and second upper rail brackets 120, 124, and a cushion pan 127. The cushion pan 127 may extend between the front portions 106a of the transmission brackets 106. A pair of side panels 116 may be coupled to or pivotally attached to the upper rail brackets 120, 124 by one or more fasteners 118.

The backrest assembly 104 may also be referred to as a backrest frame or backrest and the backrest assembly may be pivotally coupled to the cushion assembly 102 by an adjustment fitting such as a recliner 112. A transmission member such as a transmission bracket 106 may extend between the backrest 104 and the cushion assembly 102. The transmission bracket 106 may include a front portion 106a that may form a portion of the cushion assembly 102 and a rear portion 106b. The front portion 106a may be configured to support a cushion, upholstery, trim, or some combination thereof (not illustrated) to support an occupant (not illustrated) seated in the vehicle seat 100.

The rear portion 106b of the transmission bracket 106 may fixed to the backrest 104 by an attachment member such as a fastener or stud 114 that may be configured to transmit movement of the backrest 104 to the cushion assembly 102. As an example, as the recliner 112 is unlocked and the backrest 104 is reclined rearward, the backrest 104 carries the stud 114 and the transmission bracket 106 rearward, which may pivot the front links 122, 126 rearward about the upper rails brackets 120, 124. Moreover, as the recliner 112 is unlocked and the backrest 104 is reclined or tilted forward, the backrest 104 carries the stud 114 and the transmission bracket 106 forward to pivot the front links 122, 126 forward about the upper rail brackets 120, 124.

As another example, the vehicle seat 100 may be moved to a non-use position, such as a boarding position to move the seat 100 forward to provide additional space for ingress and egress in and out of the vehicle. To execute the movement of the seat 100 to the boarding position, a latch 150 (FIG. 2) may be unlocked to release a striker 110, that may be fixed to or form part of the base 103, so that a rear portion of the side panel 116 may be moved forward and away from the base 103. As the seat 100 moves to the non-use position, the transmission bracket 106 may maintain an angle between the cushion assembly 102 and the backrest 104, thus avoiding the need to remove a child safety seat (not illustrated) disposed in the vehicle seat and/or avoiding readjustment of the backrest angle when the vehicle seat 100 is returned to the use position.

Figure 2:
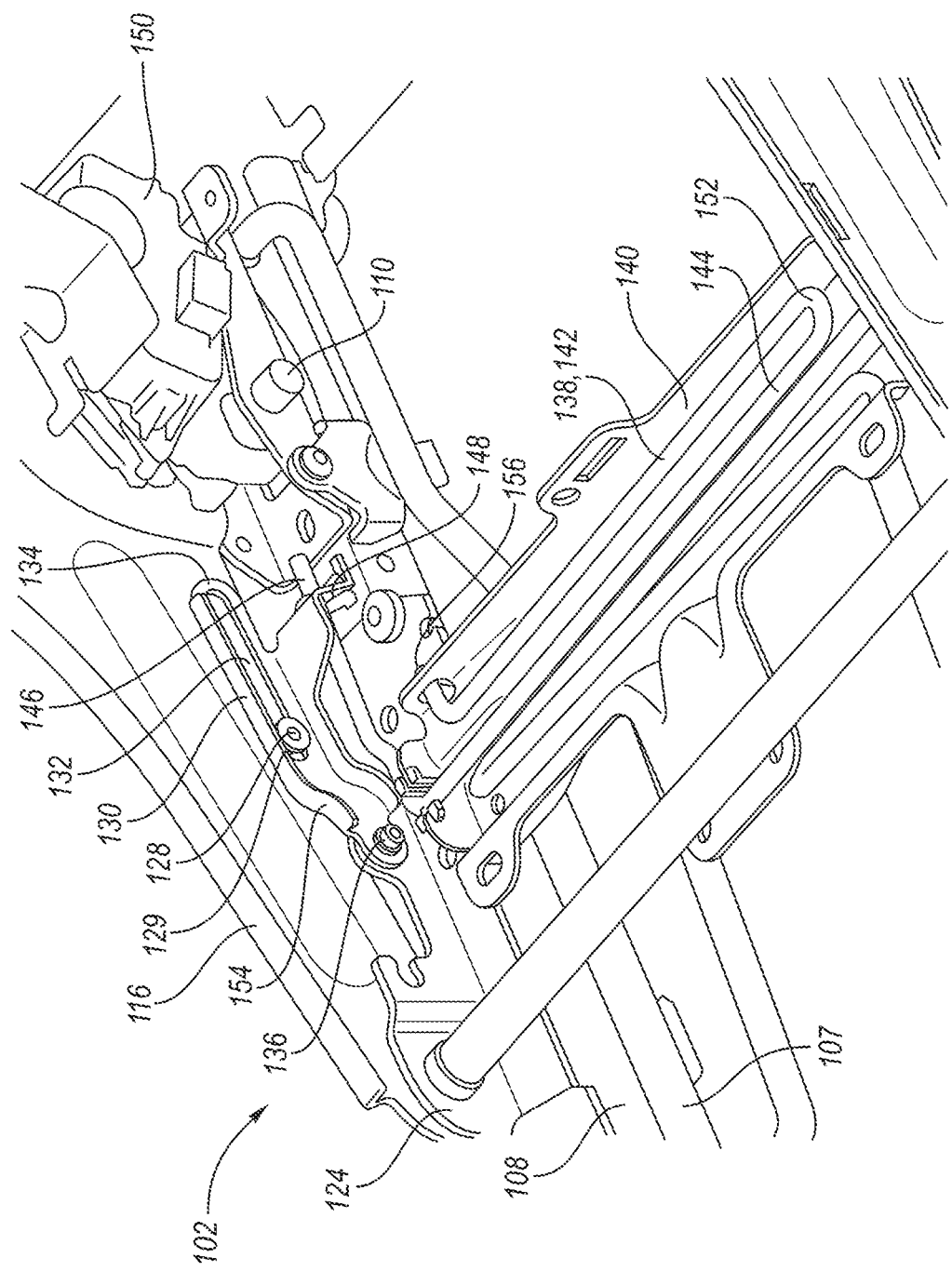
FIG. 2 illustrates a detailed-perspective view of a portion of another exemplary seat assembly.
Figure 3:
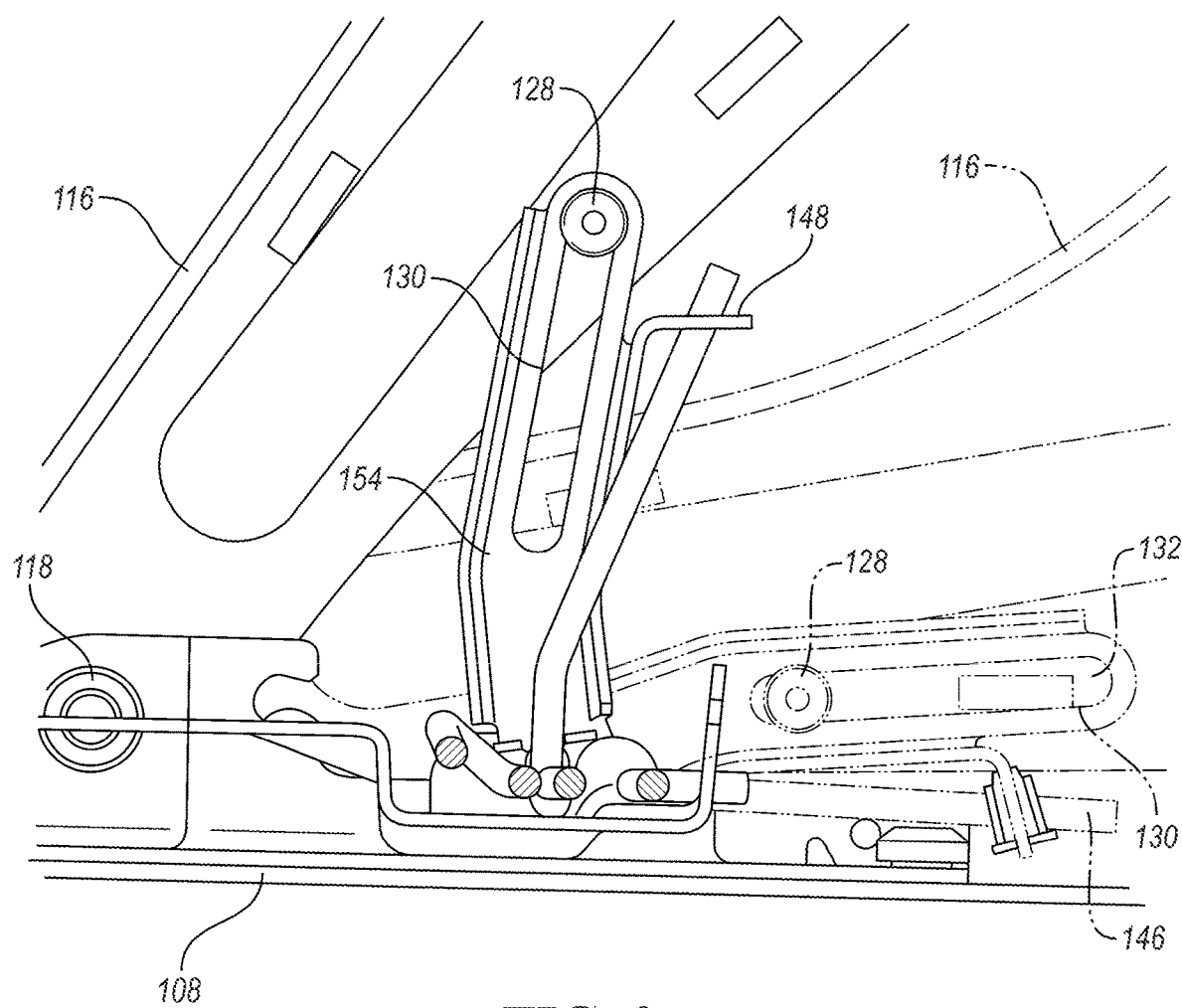
FIG. 3 illustrates a detailed-plan view of a portion of the seat assembly illustrated in FIG. 2.

FIG. 2 illustrates a perspective view of a portion of the cushion assembly 102 disposed in the use position and FIG. 3 illustrates a plan view of the cushion assembly disposed in the non-use position. The vehicle seat 100 may be moved to the non-use position, such as the boarding position by one or more mechanisms such as a cam and cam follower. The cam may be formed by an elongated bracket 130 that may be pivotally coupled to one or more portions of the base 103, such as the upper rail brackets 120, 124 by a fastener 136 or another attachment member, as required. The cam 130 may be configured to engage the cam follower, which may be formed by a fastener such as a shoulder bolt 128 that may be attached to the side panel 116. As one example, the cam follower or the surface that engages the cam may be formed by an outer surface of the shoulder 129 of the shoulder bolt 128. As another example, the cam follower 129 may be formed by a protrusion or another suitable surface that may be integrally formed by the side panel 116.

The cam 130 may be configured to rotate between a first position (FIG. 2), in which the seat cushion is in the use position, and a second position (FIG. 3), in which the seat cushion is in a non-use position, such as the boarding position. As the cam 130 rotates between the first position and the second position, a front portion of the cushion assembly 102, such as the cushion pan 127, may be tilted towards the base 103 and a rear portion of the seat cushion assembly 102 may be tilted away from the base 103. In one or more embodiments, the elongated bracket 130 may define a slot 132 and an inner periphery of the slot 132 may form a cam surface or surfaces of the cam 130 that may engage the shoulder 129 of the cam follower 128. The slot 132 may terminate at a closed end 134 of the elongated bracket 130 and the closed end 134 may engage the cam follower 128 to provide an end stop to prevent additional movement of the cam 130, the side panel 116, and the cushion assembly 102 as a whole, once the cushion assembly 102 and vehicle seat 100 are in the non-use or boarding position.

In one or more embodiments, a spring, such as a torsion spring 138 may be provided to bias the cam 130 towards the second position, as illustrated in FIG. 3. The torsion spring 138 may include one or more legs, such as a first leg 142 and a second leg 144, that may be connected by a bent or curved portion 152. The second leg 144 of the torsion spring 138 may be arranged parallel to the side panel 116 and inserted in or engaged with a flange such as a spring retention portion 148 that may extend from a main body 154 of the cam 130. As an example, the main body 154 of the cam 130 may be disposed between the side panel 116 and the spring retention portion 148. While the vehicle seat 100 includes the torsion spring 138, another mechanism such as a spindle drive or pinion drive may be used in place of or in combination with the torsion spring 138.

The length of the spring may necessitate the first and second legs 142, 144 of the torsion spring 138 to provide sufficient spring force to bias the cam 130 and move the vehicle seat assembly 100 from the use position to the non-use position. As an example, the first and second legs 142, 144 may lie along portions of the base 103, such as a transverse bracket 140 that may extend in a transverse direction. As an example, the first leg 142 of the torsion spring 138 may include an end portion that may be disposed in an aperture defined by the transverse bracket 140, and an end portion 156 of the second leg 144 of the torsion spring 138 may be fixed to the flange or the spring retention portion 148.

As referred to above, the cushion assembly 102 may include the latch 150 that may be configured to selectively change between a locked state (FIG. 2 and FIG. 4), in which the latch 150 locks the rear portion of the cushion assembly 102 to the base 103, and an unlocked state (FIG. 3 and FIG. 5), in which the latch 150 unlocks the rear portion of the cushion assembly 102 from the base 103. The latch 150 in the locked state engages the striker 110 that is attached to or integral to the base 103.

FIG. 3 illustrates a plan view of a portion of the cushion assembly 102 disposed in the non-use position and the use position. Portions of the cushion assembly 102 disposed in the use position are represented by hidden lines and portions of the cushion assembly 102 disposed in the non-use position are represented by solid lines. When the cushion assembly 102 is in the use position, the cam 130 in the first position may arranged substantially parallel to the translatable rail 108 and the cam follower 128 may be spaced apart from an end portion of the slot 132.

Figure 4:
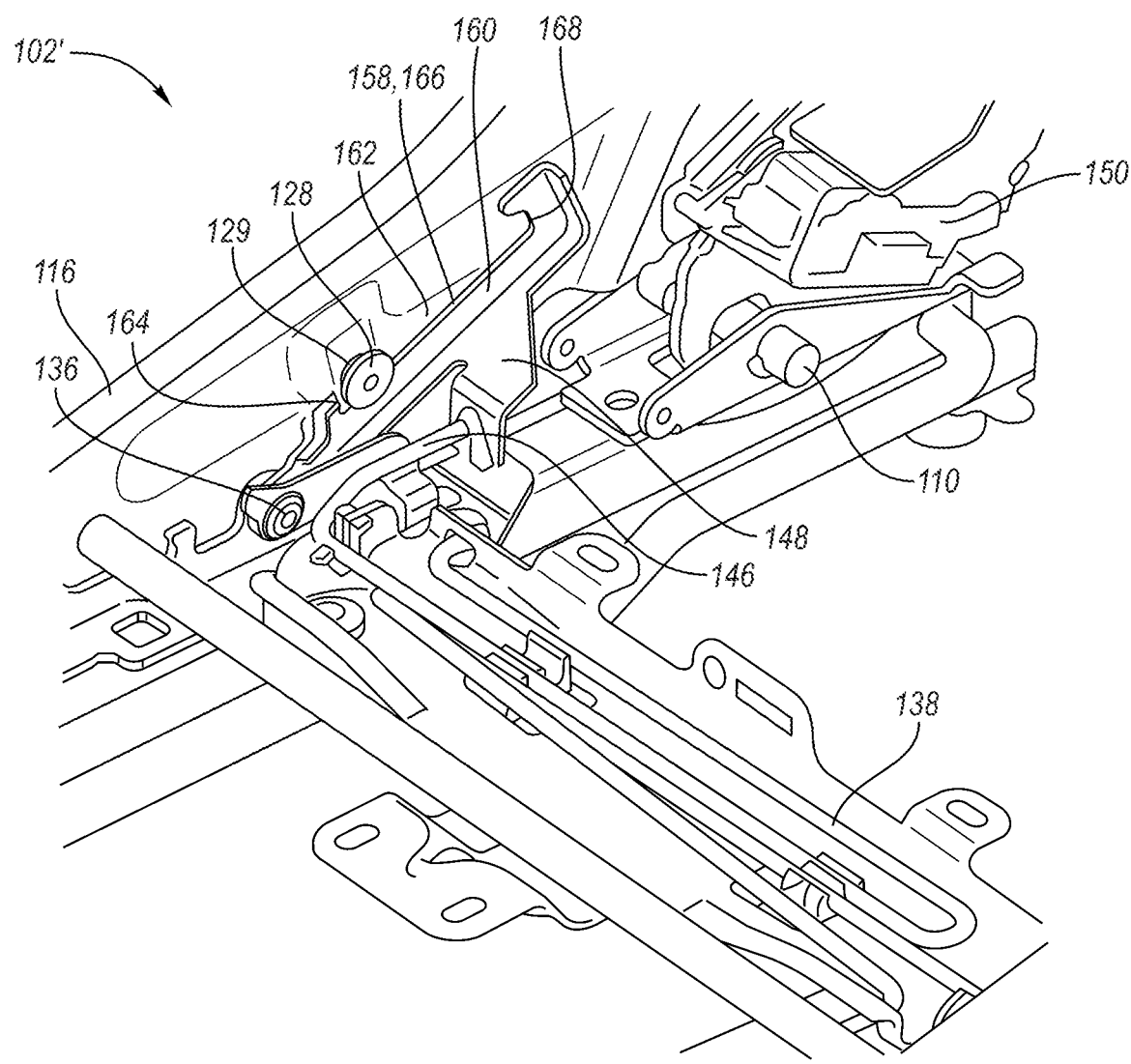
FIG. 4 illustrates a detailed-perspective view of a portion of the exemplary seat assembly illustrated in FIG. 1.
Figure 5:
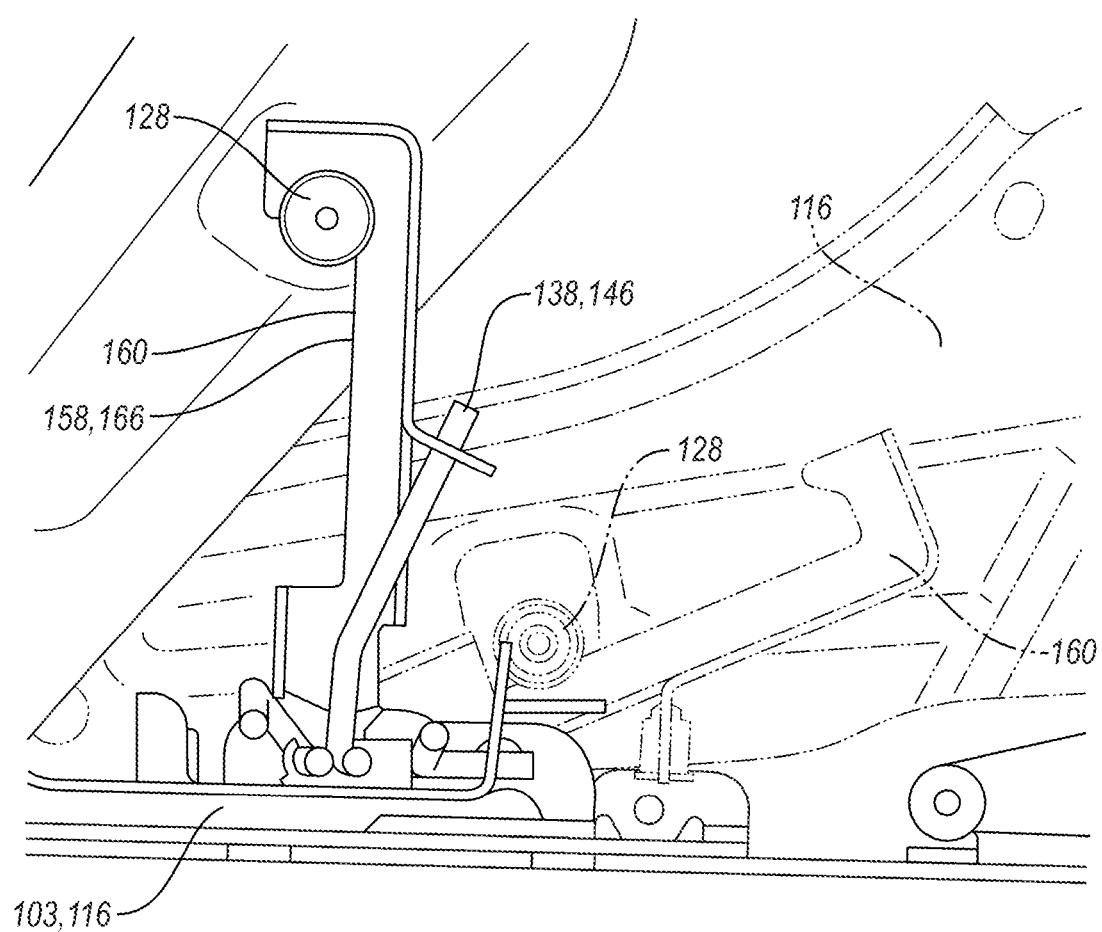
FIG. 5 illustrates a detailed-plan view of a portion of the exemplary seat assembly illustrated in FIG. 4.

FIG. 4 illustrates a perspective view of a portion of another cushion assembly 102' disposed in the use position and provided with another cam 158, according to one or more embodiments. FIG. 5 illustrates a detailed-plan view of the cushion assembly 102' disposed in the use position and the non-use position. For purposes of clarity, in FIG. 5 portions of the cushion assembly 102 disposed in the use position are represented by hidden lines and portions of the cushion assembly 102 disposed in the non-use position are represented by solid lines.

In one or more embodiments, the cam 158 may be formed by an elongated bracket 158 that may define a cutout 162 that may form a U-shaped inner periphery. The U-shaped inner periphery may be formed by a proximal leg 164, a distal leg 168, and a medial leg 166 extending therebetween. As an example, the proximal leg 164 may be positioned closer to the first end of the cam 158, such as the end pivotally coupled to the base 103 by the fastener 135. When the cam 158 is in the first position (FIG. 4) the proximal leg 164 may be spaced apart from the cam follower 128. As the cam 158 rotates about the fastener 136 from the first position the cam follower 129 may move along the medial leg 166 until the cam follower 129 engages the distal leg 168 to form an end stop to prevent additional movement of the cushion assembly 102' and the vehicle seat 100 beyond the non-use position. As stated above, the end portion 146 of the torsion spring 138 may be engaged or inserted into the flange, such as the spring engagement portion 148.

FIG. 6 illustrates another exemplary cam 170 that may be formed by another elongated bracket 170, disposed in the first position, in which the vehicle seat is in the use position. FIG. 7 illustrates the cam 170 and the seat 100 disposed in the non-use position or boarding position. For purposes of clarity the spring 138 that engages and biases the cam 170 is not illustrated in FIG. 6 and FIG. 7. In one or more embodiments, the base 103 may include an unlocking device 172 that may be configured to selectively lock and unlock the translatable rail 108 from the fixed rail 107 so that the translatable rail 108 may move along the fixed rail 107.

The unlocking device 172 may include one or more pins 174 that may be coupled to the translatable rail 108 and a locking bolt 176 that may be coupled to the one or more pins 174. The unlocking device 172 may include an unlocking lever 178 that may be configured to engage and move the locking bolt 176 to raise the pins 174 so that the pins 174 disengage the fixed rail 107. The unlocking lever 178 may include a first portion or first arm 180 and a second portion or second arm 182 that may extend from the first arm 180. The unlocking lever 178 may be pivotally coupled to a portion of the base 103, such as the fixed rail 107, the translatable rail 108, or the upper rail brackets 120, 124.

The cam 170 may include an actuation arm 184 that may extend from the elongated body of the cam 170. In response to the cam being moved or biased to rotate about the fastener 136, such as by releasing the latch 150 from the striker 110, the actuation arm 184 may pivot towards the second arm 182 of the unlocking lever 178. An engagement portion 186 disposed on a distal end of the actuation arm 184 may contact the second arm 182 of the unlocking lever 178 and pivot the unlocking lever 178 so that the first arm 180 of the unlocking lever engages and lifts the unlocking bolt 176 to disengage the locking pins 174 from the fixed rail 107, so that the translatable rail 108 may translate forward along the fixed rail 107.

Figure 8:
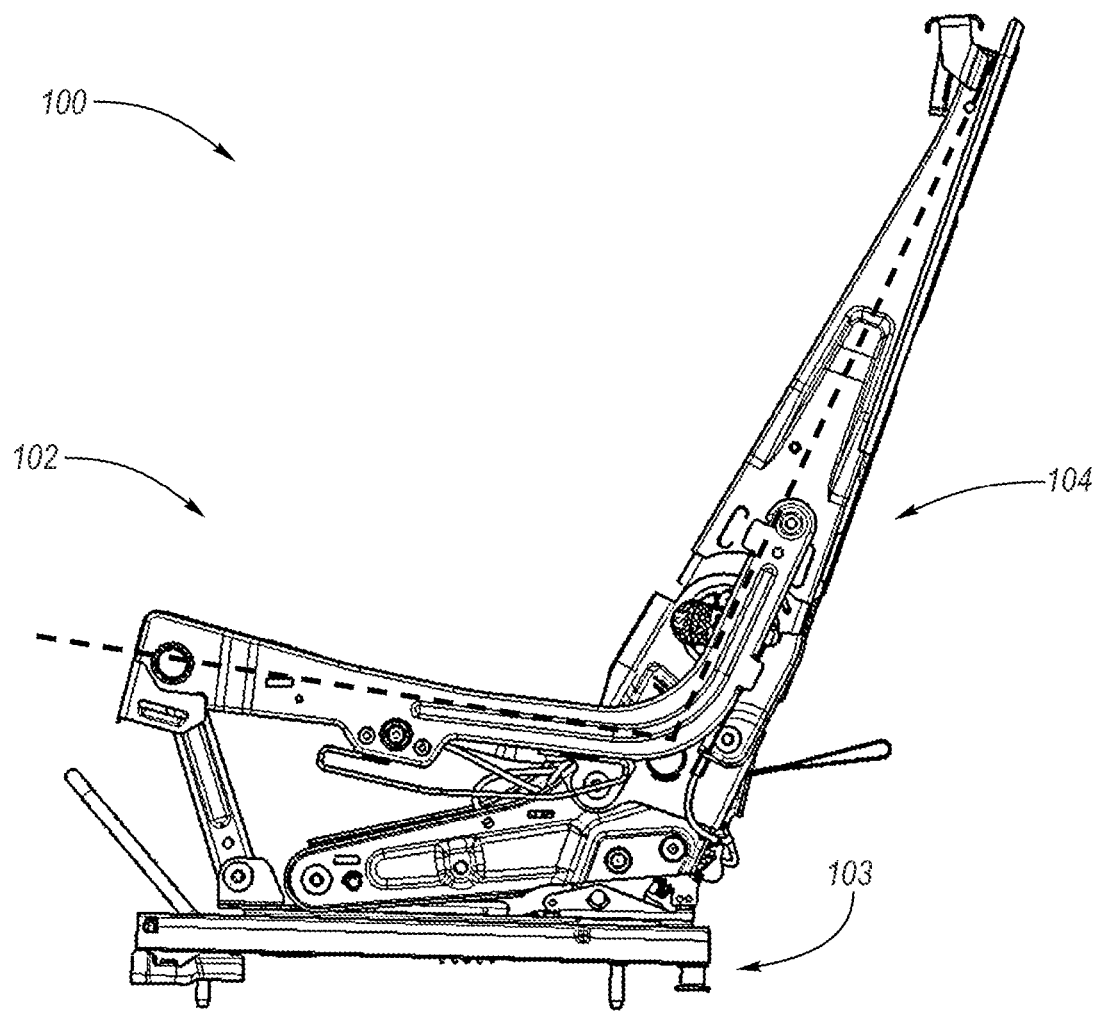
FIG. 8 illustrates a plan view of the exemplary seat assembly in the use position.
Figure 9:
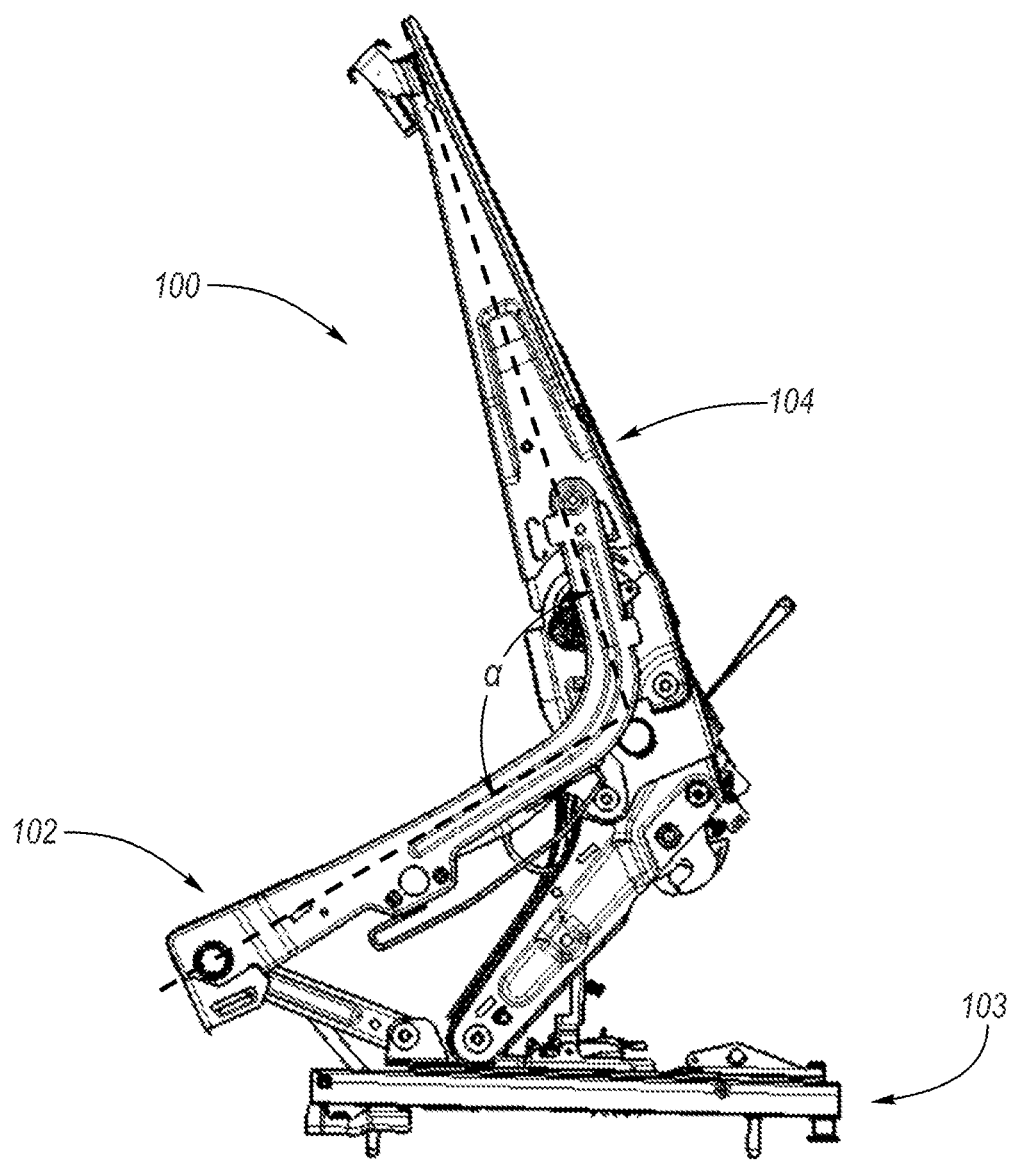
FIG. 9 illustrates a plan view of the exemplary seat assembly in a non-use position, such as a boarding position.
Figure 10:
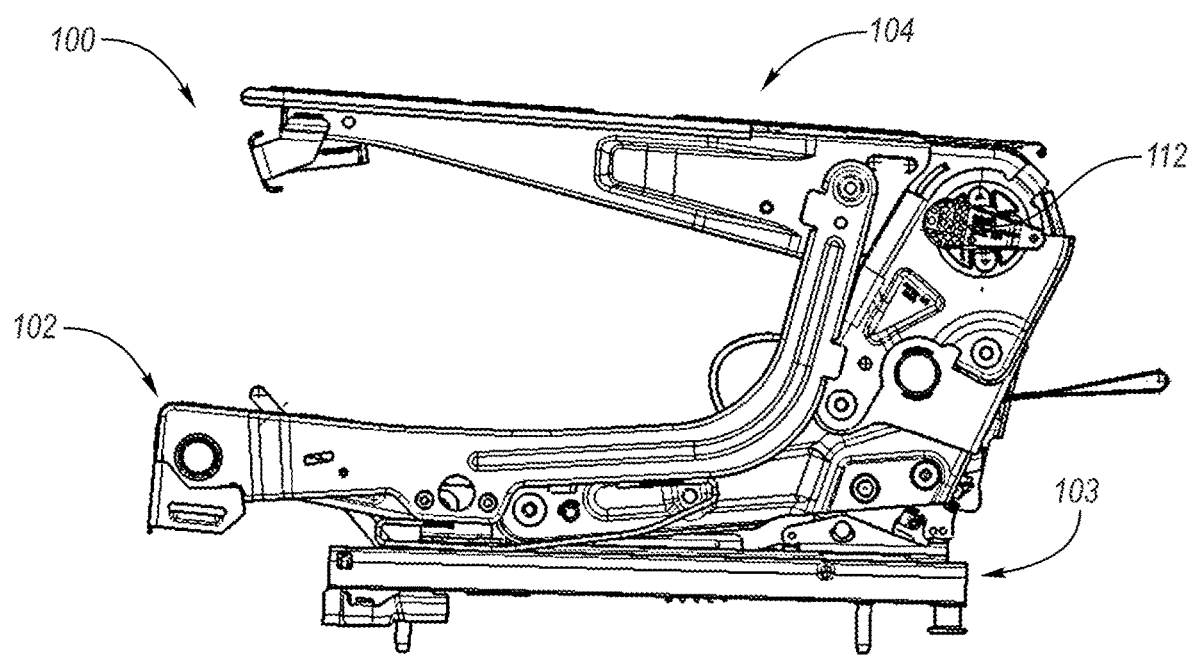
FIG. 10 illustrates a plan view of the exemplary seat assembly in a non-use position, such as a fold-flat position.

FIG. 8 illustrates a plan view of the seat assembly 100 in the use position. The base 103 may support the cushion assembly 102 and the backrest 104. In the use position, the backrest 104 and the cushion assembly 102 may form an angle α as represented by the dashed lines extending through the cushion assembly 102 and the backrest 104. FIG. 9 illustrates a plan view of the seat assembly 100 in a non-use position, such as a boarding position. In the boarding position, a rear portion of the cushion assembly 102 is tilted forward and away from the base 103 and a front portion of the cushion assembly 102 is tilted forward and towards the base 103. The cushion assembly 102 and the backrest 104 may be collectively arranged to maintain the angle α from the use position. FIG. 10 illustrates a plan view of the seat assembly 100 in a non-use position, such as a fold-flat position. To move the seat 100 to the fold-flat position, the recliner 112 may be actuated to tilt the backrest 104 towards the cushion assembly 102 and move the cushion assembly 102 towards the base 103.

Figure 11:
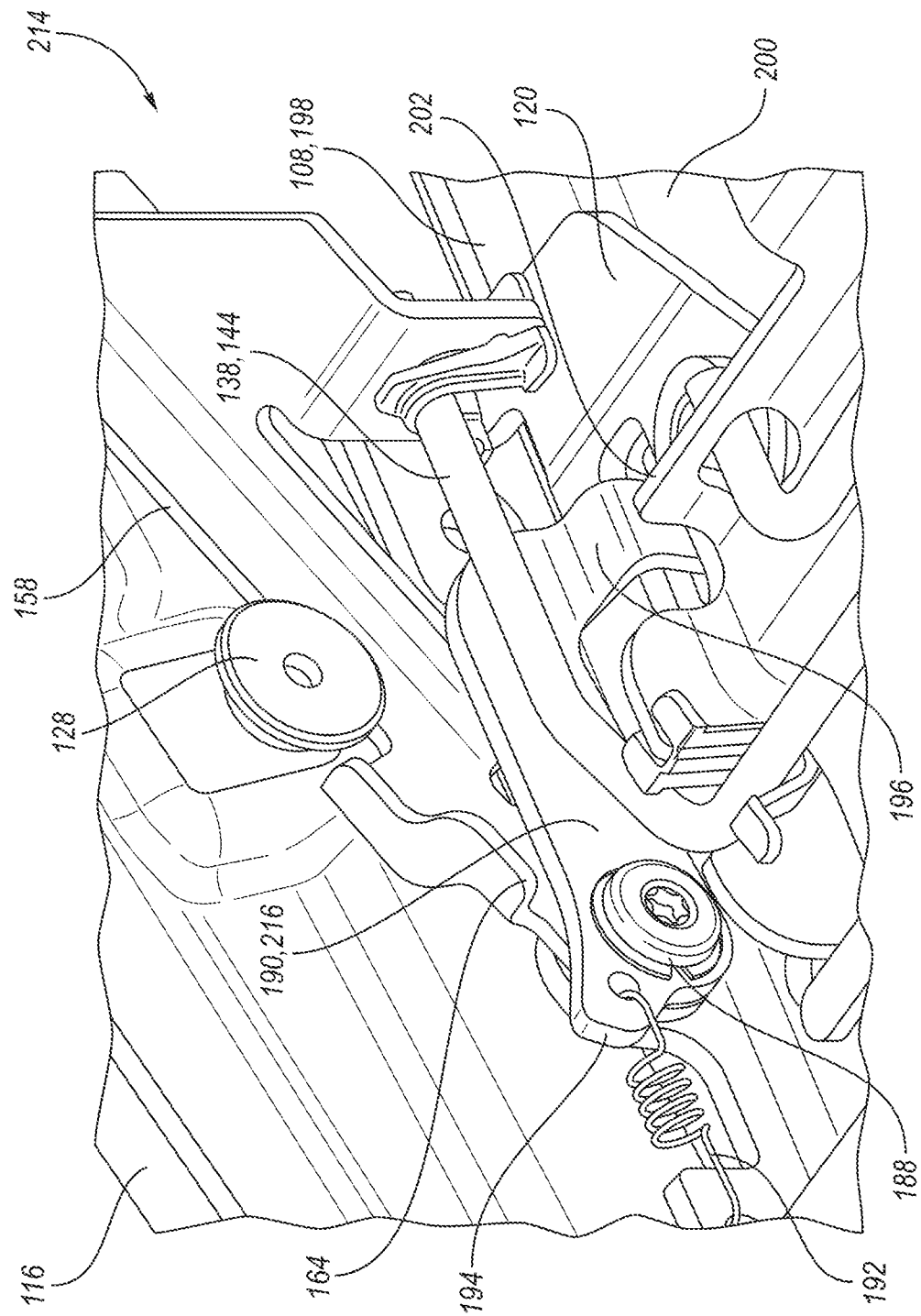
FIG. 11 illustrates a perspective view of a portion of an exemplary seat assembly in a use position.
Figure 12:
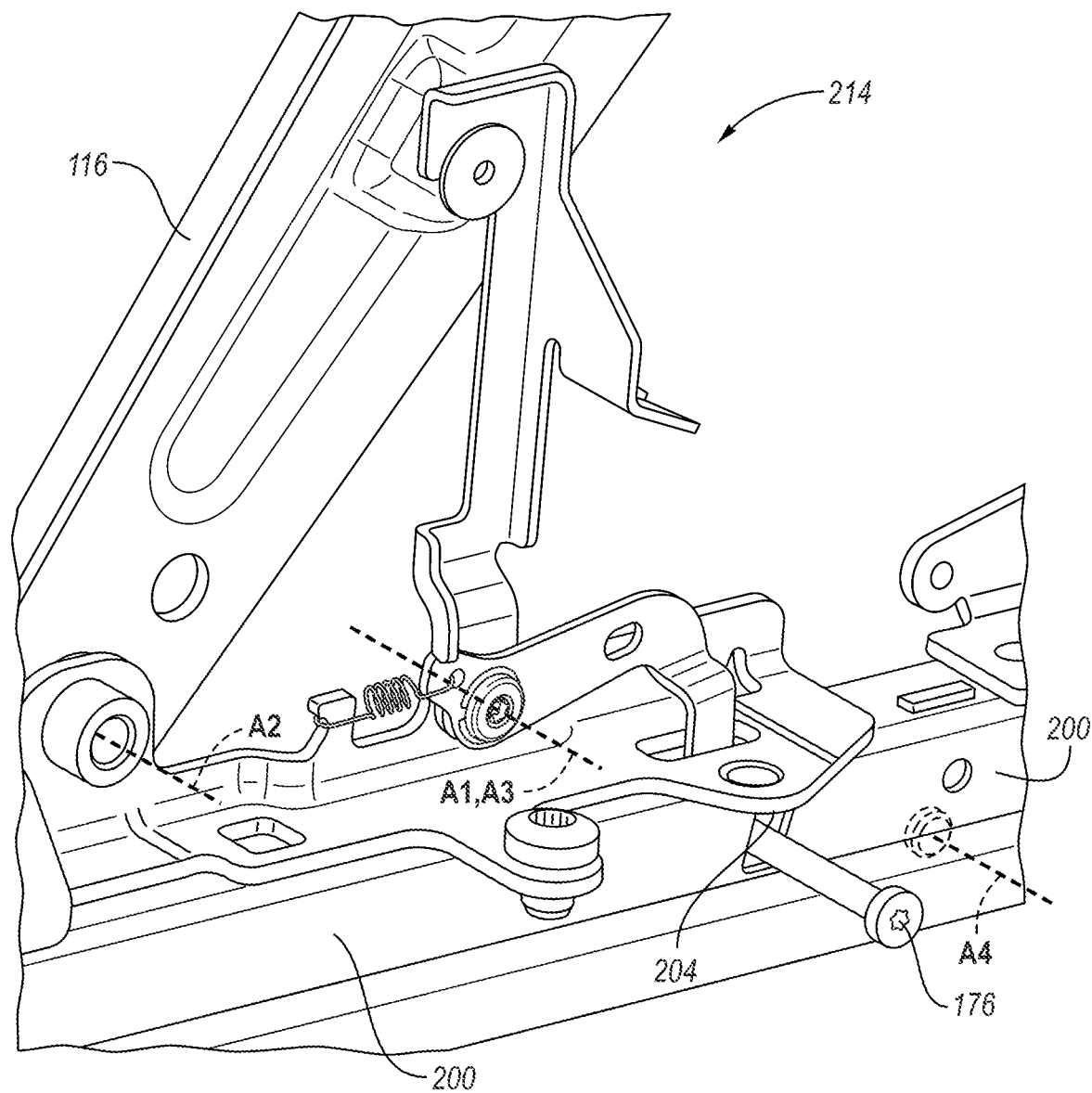
FIG. 12 illustrates a perspective view of a portion of the exemplary seat assembly illustrated in FIG. 11 in a non-use position.
Figure 13:
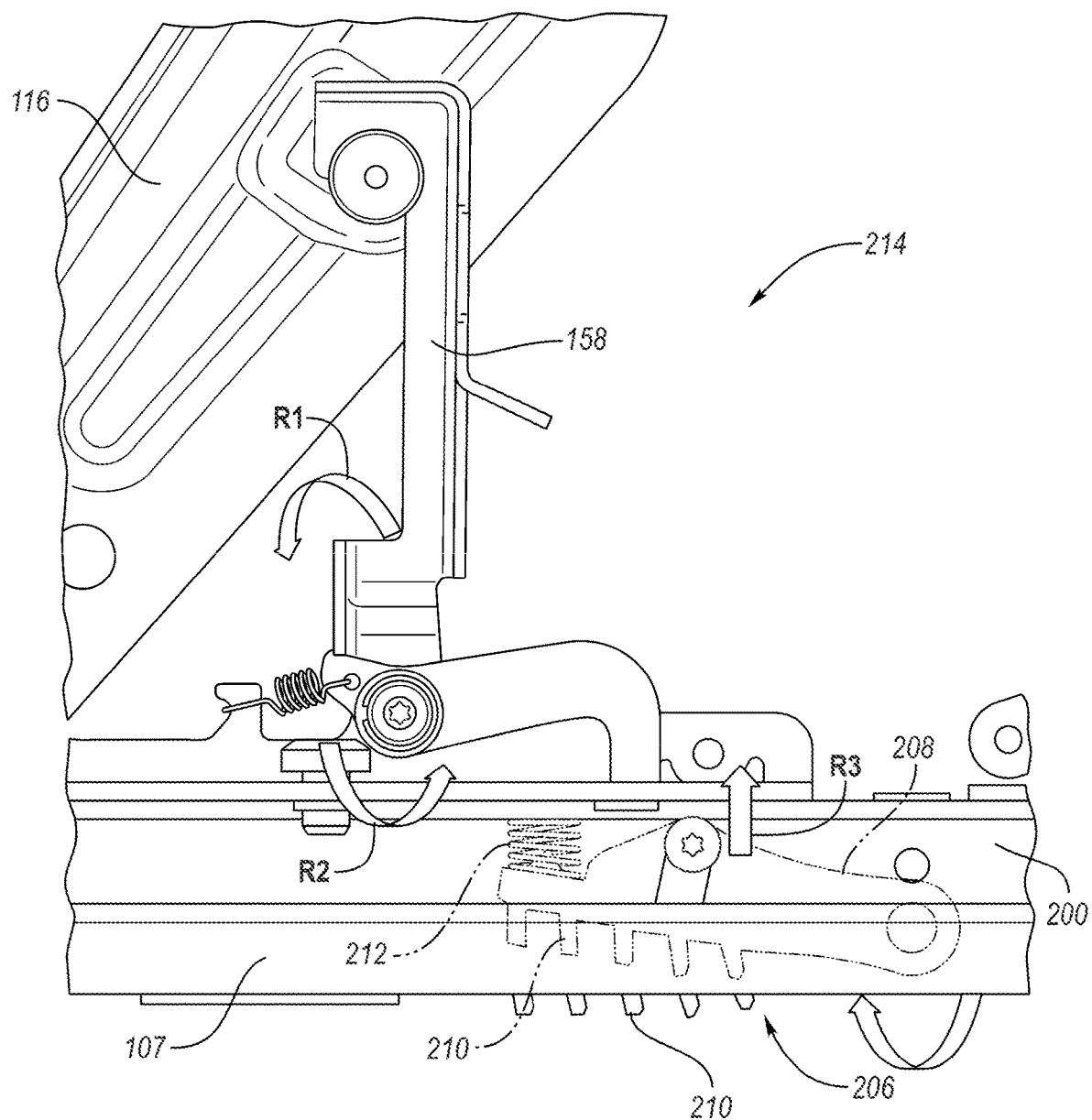
FIG. 13 illustrates a plan view of a portion of the exemplary seat assembly illustrated in FIG. 11.

FIG. 11 illustrates a perspective view of a portion of another seat assembly 214 in the use position. FIG. 12 illustrates a perspective view and FIG. 13 illustrates a plan view of the seat assembly 214 in the non-use position. The seat assembly 214 may include a number of components that are common to the vehicle seat 100 and those common components are identified by the same reference numbers provided above. In one or more embodiments, the vehicle seat 214 may include a release lever 190 that may be configured to unlock the translatable rail 108 from the fixed rail 107.

As an example, the release lever 190 and the cam 158 (or lifter) may be configured to pivot about a common axis. The release lever 190 may pivot or rotate about a first axis A1, the side panel 116 may rotate about a second axis A2, and the cam 158 may rotate about a third axis A3 that may be common with the first axis A1. The cam 158 and the release lever 190 may each be pivotally fixed to one or more portions of the base (e.g., the first upper rail bracket 120). As an example, the cam 158 may be disposed between the side panel 116 and the release lever 190 and the release lever 190 may be disposed between the cam 158 and portions (e.g., second leg 144) of the torsion spring 138. The release lever 190 may include a main body 216 and a hook 196 that may extend therefrom. In one or more embodiments, the main body 216 may be positioned parallel to the second leg 144 of the torsion spring 138.

In one or more embodiments, the translatable rail 108 may include a number of walls such as a top wall 198 and a sidewall 200 that may extend from the top wall 198. One or more upper rail brackets (e.g., first upper rail bracket 120) may be fixed (e.g., by welding or another suitable method as required) to one or more portions of the translatable rail 108 (e.g., the top wall 198). The upper rail bracket 120 and the top wall 198 may each define an aperture 202 and portions of the release lever (e.g., the hook 196) may extend through the aperture 202 so that the hook 196 is disposed within a cavity formed by the translatable rail 108. The sidewall 200 may define another aperture 204 and the locking bolt 176 may extend from the interior cavity of the translatable rail 108 through the aperture 204.

The release lever 190 may include a protrusion 194 that may be disposed forward of the fastener 188 and at least one of the first and third axes A1, A3. A spring (e.g., a coil spring) may extend between portions (e.g., the protrusion) of the release lever 190 and one or more portions of the base 103 (e.g., the upper rail bracket 120), and the spring 192 may be configured to apply tension of the release lever 190 to prevent the release lever 190 from inadvertent movement which may cause noise or vibration (e.g., buzz, squeak, and rattle).

In one or more embodiments, an unlocking device 206 may be fixed to the base 103 and configured to selectively lock and unlock the translatable rail 108 from the fixed rail 107. The unlocking device 206 may include a locking bracket 208 that may be pivotable about a fourth axis A4 between a locked position, in which a number of teeth 210 engage portions of the fixed rail 107 and unlocked position, in which the locking bracket 208 is pivoted away from the fixed rail 107 so that the number of teeth 210 do not engage the fixed rail. The fastener 176 may extend from the locking bracket 208 and as the fastener 176 is lifted, the locking bracket may be pivoted about the fourth axis A4. When the locking bracket 208 is in unlocked position, the translatable rail 108 may translate along the fixed rail 107 to a non-use position (e.g., the easy-entry position illustrated in FIG. 9).

To move the seat 214 from the use position to the non-use position (e.g., FIG. 9) the latch 150 (FIG. 4) may be released or unlatched so that the torsion spring 198 biases or moves the lifter or cam 158, as represented by arrow R1, to move (e.g., pivot) the side panel 116 about the second axis A2. The proximal leg 164 of the cam 158 may engage the release lever 190 (e.g., the protrusion 194) so that the release lever 190 pivots, as represented by arrow R2, to lift the hook 196 and the locking fastener 176, as represented by arrow R3, to pivot the locking bracket 208 about the fourth axis to the unlocked position. The unlocking device 206 may include a compression spring 212 that may be disposed between a free end of the locking bracket 208 and portions of the translatable rail 108 (e.g., the top wall 198). The compression spring 212 may be configured to bias the locking bracket 208 towards the locked position to prohibit unintentional unlocking of the unlocking device 206.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 vehicle seat
102 cushion assembly
103 base
104 backrest
105 vehicle floor
106 transmission bracket
108 translatable rail
107 fixed rail
110 striker
112 recliner
114 stud
116 side panels
118 pivot member
120 first upper rail bracket
122 first front link
124 second upper rail bracket
126 second front link
127 cushion pan
128 cam follower
130 cam, elongated bracket
132 slot
134 end stop
136 pivot fastener
138 torsion spring
140 transverse bracket
142 first leg
144 second leg
146 end portion of second leg
148 spring engagement portion
150 latch
152 bent portion
154 main body of cam
156 first end
158 cam, elongated bracket
160 main body of cam
162 cutout
164 proximal leg
166 medial leg
168 distal leg
170 cam elongated bracket
172 unlocking device
174 locking pins
176 locking bolt 178 unlocking lever
180 first arm
182 second arm
184 arm of cam
186 engagement portion
188 fastener
190 release lever
192 spring
194 protrusion of release lever
196 hook
198 top wall of translatable rail
200 sidewall of translatable rail
202 aperture (topwall)
204 aperture (side wall)
206 unlocking device
208 locking bracket
210 teeth of locking bracket
212 spring of unlocking device
214 seat assembly
216 main body of release lever

What is claimed is:

1. A seat assembly for use in a vehicle, the seat assembly comprising:
a base including a fixed rail and a translatable rail;
an unlocking device configured to selectively lock the translatable rail to the fixed rail and unlock the translatable rail from the fixed rail so that the translatable rail may translate along the fixed rail;
a release lever rotationally coupled the base;
a seat cushion coupled to and configured to pivot about the base between a use position and a non-use position, in which a front portion of the seat cushion is tilted towards the base and a rear portion of the seat cushion is tilted away from the base; and
a cam rotationally coupled to the base and configured to rotate between a first position, in which the seat cushion is in a use position, and a second position, in which the seat cushion is in a non-use position and the cam rotates the release lever to actuate the unlocking device to unlock the translatable rail from the fixed rail,
wherein the unlocking device includes a locking bracket coupled to the base and configured to pivot between an engaged position, in which the locking bracket engages the fixed rail to lock the translatable rail to the fixed rail, and
a rod extending from the locking bracket, the release lever configured to engage the rod and pivot the locking bracket.

2. The seat assembly of claim 1, wherein the release lever includes a main body and a hook, the hook extending through a first aperture defined by one or more walls of the translatable rail.

3. The seat assembly of claim 2, wherein the main body is disposed above the translatable rail.

4. The seat assembly of claim 2, wherein the unlocking device includes,
a locking bracket coupled to the base and configured to pivot between an engaged position, in which the locking bracket engages the fixed rail to lock the translatable rail to the fixed rail, and
a rod extending from the locking bracket, the hook configured to engage and lift the rod to pivot the locking bracket.

5. The seat assembly of claim 4, wherein the rod extends through a second aperture defined by the one or more walls of the translatable rail.

6. The seat assembly of claim 1, further comprising:
a torsion spring including a leg coupled to the cam configured to bias the cam towards the second position, the release lever including a main body and a hook portion, the main body extending parallel to the leg.

7. The seat assembly of claim 6, wherein the leg covers the hook portion when the seat cushion is in the use position.

8. A seat assembly for use in a vehicle, the seat assembly comprising:
a base including a fixed rail and a translatable rail;
an unlocking device configured to selectively lock the translatable rail to the fixed rail and unlock the translatable rail from the fixed rail so that the translatable rail may translate along the fixed rail;
a release lever coupled to the base and configured to rotate about a first axis to actuate the unlocking device;
a seat cushion coupled to the base and configured to pivot about a second axis between a use position and a non-use position;
a lifter configured to rotate about a third axis between a first position, in which the seat cushion is in the use position and a second position, in which the seat cushion is in the non-use position, wherein as the lifter moves from the first position to the second position; and
a torsion spring including a leg coupled to the lifter, wherein the torsion spring is configured to bias the lifter to pivot the seat cushion between the use position and the non-use position, and wherein the lifter engages the release lever to actuate the unlocking device to unlock the translatable rail from the fixed rail.

9. The seat assembly of claim 8, wherein the first axis and the third axis are the same.

10. The seat assembly of claim 8, wherein the second axis is disposed forward of the first axis.

11. The seat assembly of claim 8, wherein the unlocking device includes a locking bracket coupled to the translatable rail and configured to rotate about a fourth axis between an engaged position, in which the locking bracket engages the fixed rail, and a disengaged position, in which the locking bracket is disengaged from the fixed rail.

12. The seat assembly of claim 11, wherein the fourth axis is disposed rearward of the first axis.

13. The seat assembly of claim 8, further comprising:
a latch configured to selectively unlock the seat cushion from the base, wherein in response to the latch selectively unlocking the seat cushion from the base, the torsion spring biases the lifter towards the second position.

14. The seat assembly of claim 8, wherein the lifter includes a main body and a flange extending from the main body, wherein the flange is configured to engage a portion of the release lever.

15. The seat assembly of claim 14, wherein the portion of the release lever is formed by a protrusion extending from a main body of the release lever.

16. The seat assembly of claim 8, further comprising:
a spring fixed to the release lever and the base, the spring configured to hold the release lever when the seat cushion is in the use position.

17. A method of adjusting a vehicle seat between a use position and a non-use position, the method comprising:
rotating, by a torsion spring, a lifter coupled to a seat cushion to pivot the seat cushion so that a front portion of the seat cushion moves towards a base of the vehicle seat and a rear portion of the seat cushion moves away from the base, wherein the base of the vehicle seat includes a fixed rail and a translatable rail;

pivoting a release lever by the lifter engaging the release lever; and unlocking the translatable rail from the fixed rail.

18. The method of claim 17, further comprising:

unlatching a latch to unlock a seat cushion from a base of the vehicle seat to permit the torsion spring to rotate a free end of the lifter away from the base.

19. The method of claim 17, wherein the unlocking step includes pivoting a locking bracket by the release lever engaging a portion of the locking bracket.

20. The method of claim 17, wherein the unlocking step includes pivoting a locking bracket, and the release lever includes a main body and a hook extending from the main body and through an aperture defined by the translatable rail, wherein the unlocking step includes lifting a fastener extending from the locking bracket.

\* \* \* \* \*